United States Patent
Su et al.

(10) Patent No.: US 11,996,519 B2
(45) Date of Patent: May 28, 2024

(54) GELLED ELECTROLYTE AND PREPARATION METHOD THEREOF

(71) Applicant: EVONIK OPERATIONS GMBH, Essen (DE)

(72) Inventors: Shasha Su, Shanghai (CN); Jinhua Jiang, Shanghai (CN); Jing Feng, Shanghai (CN); Dong Wang, Shanghai (CN); Yuan-Chang Huang, Taipei (TW); Jun Yang, Shanghai (CN); Bin Lei, Shanghai (CN); Zhixin Xu, Shanghai (CN)

(73) Assignee: Evonik Operations GmbH, Essen (DE)

( * ) Notice: Subject to any disclaimer, the term of this patent is extended or adjusted under 35 U.S.C. 154(b) by 589 days.

(21) Appl. No.: 17/274,185

(22) PCT Filed: Sep. 9, 2019

(86) PCT No.: PCT/CN2019/104846
§ 371 (c)(1),
(2) Date: Mar. 7, 2021

(87) PCT Pub. No.: WO2020/052507
PCT Pub. Date: Mar. 19, 2020

(65) Prior Publication Data
US 2022/0052376 A1      Feb. 17, 2022

(30) Foreign Application Priority Data

Sep. 10, 2018   (WO) ................ PCT/CN2018/104777

(51) Int. Cl.
*H01M 10/0565*   (2010.01)
*H01M 10/0525*   (2010.01)

(52) U.S. Cl.
CPC ... *H01M 10/0565* (2013.01); *H01M 10/0525* (2013.01); *H01M 2300/0037* (2013.01); *H01M 2300/0085* (2013.01)

(58) Field of Classification Search
None
See application file for complete search history.

(56) References Cited

U.S. PATENT DOCUMENTS

| | | |
|---|---|---|
| 8,541,138 B2 | 9/2013 | Kazacos et al. |
| 10,205,190 B2 | 2/2019 | Lee et al. |

(Continued)

FOREIGN PATENT DOCUMENTS

| | | |
|---|---|---|
| CN | 102208680 | 10/2011 |
| CN | 103000956 | 3/2013 |

(Continued)

OTHER PUBLICATIONS

Outline of objections by Examiner from Japanese Office Action for corresponding JP 2021-513337, prepared Feb. 7, 2022.

(Continued)

*Primary Examiner* — Wyatt P McConnell
(74) *Attorney, Agent, or Firm* — Law Office of: Michael A. Sanzo, LLC (57) ABSTRACT

A gel composition, in particular a gelled electrolyte, comprising: i) fumed alumina particles, wherein the mean primary particle size of the particle is from 5 to 50 nm and the BET specific surface area is from 40 to 400 m$^2$/g; ii) at least two organic solvents; and iii) a lithium salt; wherein the amount of the alumina particles is 0.2-10% by weight based on the total weight of the gel composition. A method to prepare a gelled electrolyte, a Li-ion battery, a Li-ion battery and a device are also provided.

20 Claims, 4 Drawing Sheets

(56) References Cited

U.S. PATENT DOCUMENTS

| | | | |
|---|---|---|---|
| 2008/0292964 A1 | 11/2008 | Kazacos et al. | |
| 2012/0189913 A1* | 7/2012 | Wakizaka | H01M 4/364 429/211 |
| 2016/0064770 A1* | 3/2016 | Lee | H01M 10/056 429/188 |
| 2018/0034027 A1* | 2/2018 | Shang | H01M 50/491 |

FOREIGN PATENT DOCUMENTS

| | | |
|---|---|---|
| CN | 103579670 | 2/2014 |
| EP | 1 605 537 | 12/2005 |
| JP | H10 334730 | 12/1988 |
| JP | 2001-1229967 | 8/2001 |

OTHER PUBLICATIONS

Summary of Chinese Office Action for corresponding CN 201980059531.9, filed Apr. 16, 2021.

International Search Report for corresponding international application PCT/CN2019/104846 filed Sep. 9, 2019.

Written Opinion of the International Searching Authority for corresponding international application PCT/CN2019/104846 filed Sep. 9, 2019.

International Preliminary Report on Patentability for corresponding international application PCT/CN2019/104846 filed Sep. 9, 2019.

Fang, et al., "Soggy sand electrolyte based on COOH-functionalized silica nanoparticles for dye-sensitized solar cells," *Electrochemistry Communications* 16(1):10-13 (Mar. 2021).

Kreja, et al., "The presence of nanostructured Al2O3 in PMMA-based gel electrolytes," *Journal of Power Sources* 178(2):774-778 (Oct. 2008).

Xu, et al., "Hybrid electrolytes incorporated with dandelion-like silane-$Al_2O_3$ nanoparticles for high-safety high-voltage lithium ion batteries," *Journal of Power Sources* 391:113-119 (Jul. 2018).

European Search Report and Search Opinion for corresponding EP 19 85 8784, filed Sep. 9, 2019.

\* cited by examiner

GELLED ELECTROLYTE AND PREPARATION METHOD THEREOF

CROSS REFERENCE TO RELATED APPLICATIONS

The present application is US national stage of international application PCT/CN2019/104846, which had an international filing date of Sep. 9, 2019 and which was published on Mar. 19, 2020. The application claims priority under 35 USC § 119 to international application PCT/CN2018/104777, filed in China on Sep. 10, 2018. The contents of the priority application is hereby incorporated by reference in its entirety.

TECHNICAL FIELD

The present invention relates to Li-ion batteries. More specifically, the invention relates to a novel gelled electrolyte that can improve the performance of a lithium ion battery.

BACKGROUND ART

The Li-ion batteries are widely used in modern society due to their advantages such as high operating voltage, small size, and high energy density, no memory effect, and long cycle life. Organic liquid electrolytes are generally applied in current commercial lithium-ion batteries. However, on the one hand, there is a potential safety hazard caused by possible leakage of the electrolyte due to poor mechanical strength of the battery; on the other hand, the low ignition and boiling points of an electrolyte are likely to promote its evaporation and decomposition at a high temperature to generate toxic flammable gases, which easily cause fire explosion and other safety issues. Although some polymer electrolytes were designed to alleviate the deficiency of liquid electrolytes to some extent, the poor room temperature conductivity still introduces several constraints on their application.

Y. Fang et al. (Y. Fang et al. *Electrochemistry Communications*, vol. 16 (2012), pp 10-13) disclose a carboxyl group-functionalized silica nano-structured particles, which are employed as framework to form "soggy sand" electrolyte for dye-sensitized solar cells. The cells based on electrolyte containing such carboxyl group-functionalized nano-structured silica particles show better performance owing to the increased short-circuit photocurrent, than that of the liquid device and yield the energy conversion efficiency of 7.1% under AM1.5 illumination at 100 mV cm$^{-2}$, when the content of the carboxyl group-functionalized silica is 15% by weight.

H. Xu et al. (H. Xu et al. *Journal of Power Sources*, vol. 391 (2018) pp. 113-119) disclose hybrid electrolytes with incorporated dandelion-like silane-alumina particles for high-safety high-voltage lithium ion batteries. The electrolyte uses organically modified alumina. However, it does not disclose the use of unmodified alumina and its performance.

EP 1 605 537 A1 discloses the use of gel electrolytes comprising alumina in batteries. The alumina is preferably hydrophobic. This patent application does not disclose the performance of such batteries such as electrochemical rate.

SUMMARY OF THE INVENTION

The inventors have surprisingly found through research that the physical-chemical properties such as ionic conductivity, gelling performance and electrochemical stability of gelled electrolytes depend on several factors including gelling agent material types, reactive group on the gelling agent particle surface, particle size distribution of gelling agent, etc.

The present invention provides a gel composition, in particular a gelled electrolyte, comprising
i) alumina particles, wherein the mean primary particle size of the alumina particle is from 5 to 50 nm, preferably from 10 to 30 nm and the BET specific surface area is from 40 to 400 m$^2$/g, preferably from 50 to 150 m$^2$/g;
ii) at least two organic solvents; and
iii) a lithium salt;
wherein the amount of the alumina particles is 0.2-10% by weight preferably 0.5-8% by weight, based on the total weight of the gel composition.

The amount of the alumina particles is 0.2-10% by weight, including 0.5-10% by weight, 0.6-10% by weight, 0.7-10% by weight, 0.8-10% by weight, 0.9-10% by weight, 1-10% by weight, 0.5-9% by weight, 0.6-9% by weight, 0.7-9% by weight, 0.8-9% by weight, 0.9-9% by weight, 1-9% by weight, 0.5-8% by weight, 0.6-8% by weight, 0.7-8% by weight, 0.8-8% by weight, 0.9-8% by weight, 1-8% by weight, preferably 0.5-8% by weight, based on the total weight of the gel composition.

The present invention also provides a method to prepare a gelled electrolyte, comprising the following steps:
1) Mixing at least two organic solvents and a lithium salt to obtain a liquid mixture; and
2) Dispersing alumina particles in the liquid mixture to obtain the gelled electrolyte, wherein the mean primary particle size of the particle is from 5 to 50 nm, preferably from 10 to 30 nm and the BET specific surface area is from 40 to 400 m$^2$/g, preferably from 50 to 150 m$^2$/g; and wherein the amount of the alumina particles is 0.2-10% by weight, preferably 0.5-8% by weight, based on the total weight of the gel composition.

In step 2), the dispersion may be implemented by ultrasonic treatment or other conventional dispersing methods.

Preferably, the alumina particles are dried before mixing with the solvents in Step 1).

In some embodiments, the alumina particles are dried in vacuum at high temperature, for example at over 120° C., preferably above 140° C., for a period of time, for example 12 hours. Then the dried powder is transferred to a glove box with inert gas atmosphere, for example argon gas with moisture content of below 10 ppm.

The present invention further provides a gelled electrolyte, prepared according to the method to prepare a gelled electrolyte described above.

The present invention further provides a Li-ion battery, comprising the gel composition of the invention as a gelled electrolyte.

The present invention further provides a device, particularly an electric device comprising the Li-ion battery of the invention. The device may be any device that may utilize the Li-ion battery of the invention as a power supply, for example a vehicle, a phone, a home appliance, a toy, etc.

The present invention further provides a method to improve electrochemical rate performance of a gelled electrolyte or a Li-ion battery comprising the gelled electrolyte, wherein the electrolyte comprises alumina particles,
wherein the mean primary particle size of the alumina particle is from 5 to 50 nm, preferably from 10 to 30 nm and the BET specific surface area is from 40 to 400 m$^2$/g, preferably from 50 to 150 m$^2$/g; and wherein the amount of the alumina particles is 0.2-10% by weight, preferably 0.5-8% by weight, based on the total weight of the gel composition.

The present invention further provides the use of alumina particles to improve electrochemical rate performance of a gelled electrolyte or a Li-ion battery comprising the gelled electrolyte of the invention,
wherein the mean primary particle size of the alumina particle is from 5 to 50 nm, preferably from 10 to 30 nm and the BET specific surface area is from 40 to 400 m$^2$/g, preferably from 50 to 150 m$^2$/g; and
wherein the amount of the alumina particles is 0.2-10% by weight, preferably 0.5-8% by weight, based on the total weight of the gel composition.

The organic solvents in the present invention are conventional in the art. Examples of organic solvents include ethylene carbonate (EC), dimethyl carbonate (DMC), propylene carbonate, ethylene carbonate, methylethyl carbonate, diethyl carbonate etc.

The lithium salt in the invention is conventional in the art. Examples of lithium salt includes lithium hexafluorophosphate (LiPF$_6$), lithium bis 2-(trifluoromethylsulfonyl)imide (LiTFSI), LiClO$_4$, LiBF$_4$, Li$_2$SiF$_6$, LiN (SO$_2$CF$_2$CF$_3$) etc.

The alumina particles of the present invention are fumed alumina particles. Preferably, the fumed alumina particles are not surface-modified. For example, the alumina particles under tradename AEROXIDE® Alu 130 (commercially available from Evonik Special Chemicals (Shanghai) Co., Ltd.).

In some embodiments, the preparation method of the gelled electrolyte is as follows:
1) The alumina particles are vacuum dried at high temperature and transferred to a glove box with inert gas atmosphere; and
2) Two organic solvents of the electrolyte are mixed, then the lithium salt is added to this mixture followed by dispersing the pre-dried particles obtained in Step 1).

Preferably, in step 2), the solution of 1 M lithium hexaflurophosphate (LiPF$_6$) is mixed with a mixture of EC/DMC (1:1 volume/volume) and then with the pre-dried particles obtained in Step 1).

The battery materials other than electrolyte such as cathode active material, anode active material, and separator are all of conventional types. For example, the cathode may be composed of a current collector and an active material with binder and conductive carbon inside.

The present invention provides a novel gelled electrolyte which combines the advantages of favorable mechanical properties of the polymer electrolyte and high conductivity of the liquid electrolyte, and can effectively improve the safety, electrochemical rate and cycle performance of the Li-ion batteries.

Other advantages of the present invention would be apparent for a person skilled in the art upon reading the specification.

DETAILED DESCRIPTION OF THE INVENTION

To describe the content and effects of the present invention in detail, the present invention will be further described below in combination with the examples and comparative examples and with the related drawings.
Preparation of a Li-Ion Battery:
The Li-ion batteries were prepared according to the following method:
Step a) Preparation of an electrolyte; and
Step b) Assembly of a Li-ion battery.

Example 1

Preparation of a Gelled Electrolyte:
A gelled electrolyte was prepared according to the following method:
1) 100 g of surface un-modified alumina particles AEROXIDE® Alu 130 (manufacturer: Evonik Special Chemicals (Shanghai) Co., Ltd., BET surface area: 110-150 m$^2$/g) were dried at 150° C. under vacuum (pressure 0.1 bar) for 12 hours and transferred to a glove box under inert atmosphere of argon with a moisture content of below 10 ppm;
2) Two solvents of the electrolyte EC and DMC were mixed in proportion 1/1 (volume/volume); then the lithium hexaflurophosphate (LiPF$_6$) was added to the mixture of EC/DMC to prepare a 1 M solution of lithium salt in the solvent mixture of EC/DMC; and
3) The 1 M solution of 11.5 g LiPF$_6$ in EC/DMC prepared in Step 2) above was mixed with 1 g of pre-dried particles obtained in Step 1), followed by 15 minutes of ultrasonic treatment.

Figure 1:
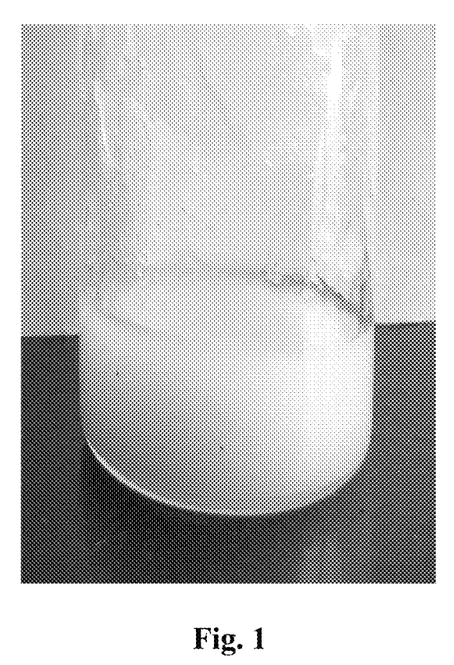
FIG. 1 shows the electrolyte of Example 1.

A gel-like milky white electrolyte was prepared, see FIG. 1.

The mean primary particle size of the particle was 10-20 nm. The amount of the alumina particles was 8% by weight based on the total weight of the gel composition.
Assembly of a Li-Ion Battery:
The assembly of Li-ion battery was done in the glove box under inert atmosphere of argon. The positive electrode case, the cathode, the separator, the anode, the nickel foam, and the negative electrode case were sequentially assembled and compacted at 5 MPa by a tablet pressing machine. During the whole assembly process, a suitable amount of the prepared electrolyte was sandwiched between the anode and the cathode with a blade.

Example 2

A gelled electrolyte was prepared according to the following method:
1) 100 g of surface un-modified alumina particles AEROXIDE® Alu 130 (BET surface area is 110-150 m$^2$/g) were dried at 150° C. under vacuum (pressure 0.1 bar) for 12 hours and transferred to a glove box under inert atmosphere of argon with a moisture content of below 10 ppm;
2) Two solvents of the electrolyte EC and DMC were mixed in proportion 1/1 (volume/volume); then the lithium salt LiPF$_6$ was added to the mixture of EC/DMC to prepare a 1 M solution of LiPF$_6$ in solvent mixture of EC/DMC; and
3) The 1 M solution of 9.9 g LiPF$_6$ in a mixture of EC/DMC prepared in Step 2) above was mixed with 0.1 g of pre-dried particles obtained in Step 1), followed by 15 minutes of ultrasonic treatment.

A gel-like milky white electrolyte was prepared.

The mean primary particle size of the alumina particle was 10-20 nm. The amount of the alumina particles was 1% by weight based on the total weight of the gel composition.

A Li-ion battery was assembled according to the same method as described in Example 1.

Comparative Example 1

A Liquid Electrolyte was Prepared According to the Method as Follows:

Two solvents of the electrolyte EC (ethylene carbonate) and DMC (dimethyl carbonate) were mixed in proportion 1/1 (volume/volume). Then the lithium salt $LiPF_6$ was added to the mixture of EC/DMC to prepare a 1 M solution of $LiPF_6$ in the solvent mixture of EC/DMC. The 1 M solution of $LiPF_6$ in the solvent mixture of EC/DMC was used as the liquid electrolyte in this comparative example.

A Li-ion battery was assembled according to the same method as described in Example 1, except that during the whole assembly process, a suitable amount of the liquid electrolyte was dropped between the cathode and the anode.

Comparative Example 2

A gelled electrolyte was prepared according to the same method as described in Example 1, except that 100 g trimethoxysilane-modified fumed alumina (grade AEROXIDE® Alu C 805, commercially available from Evonik Special Chemicals (Shanghai) Co., Ltd., BET surface area: 70-130 $m^2/g$, mean primary particle size of the alumina particle: 10-20 nm) particles were used. The amount of the trimethoxysilane-modified alumina particles was 8% by weight based on the total weight of the gel composition.

A Li-ion battery was assembled according to the same method as described in Example 1.

Comparative Example 3

A gelled electrolyte was prepared according to the same method as described in Example 1, except that 100 g of un-modified silica particles (grade AEROSIL® 200, commercially available from Evonik Special Chemicals (Shanghai) Co., Ltd., BET surface area: 175-225 $m^2/g$, mean primary particle size of the silica particle: 12 nm) were used and 1 g of the pretreated silica particles were added dispersed into 20 g of the solution prepared in Step 2), followed by ultrasonic treatment for 15 minutes to obtain a transparent gel electrolyte. The amount of the un-modified silica particles was 5% by weight based on the total weight of the gel electrolyte.

A Li-ion battery was assembled according to the same method in Example 1.

Comparative Example 4

An electrolyte mixture was prepared according to the same method as described in Example 1, except that 100 grams of surface un-modified titania particles produced in a fumed process (grade AEROXIDE® $TiO_2P$ 90, commercially available from Evonik Special Chemicals (Shanghai) Co., Ltd., BET surface area: 70-110 $m^2/g$, mean primary particle size of the titania particle:14 nm) was used. The amount of the surface un-modified fumed titania particles was 7% by weight based on the total weight of the final electrolyte mixture.

In Step 3), after 15 minutes of ultrasonic treatment, titania particles were dispersed homogeneously in the solution prepared in Step 2) but could not form a gel, and the electrolyte viscosity did not go up as well. See FIG. 2.

Ionic Conductivity Test of the Electrolytes

A conductivity meter (Model DDS-307A, manufactured by Shanghai INSEA Scientific Instrument Co., Ltd., China) was used to conduct conductivity test in a glove box. At room temperature, 3 ml of the prepared electrolyte was placed in a sample cell and tested after the calibration of the conductivity meter. During the test, the test electrode of the conductivity meter was completely immersed, and the measured values were recorded first in the stable mode, when no more fluctuation of the values could be observed.

TABLE 1

| Ionic Conductivity of Electrolytes | | | | | |
|---|---|---|---|---|---|
| | Example 1 | Example 2 | Comparative Example 1 | Comparative Example 2 | Comparative Example 3 |
| Ionic conductivity (ms/cm) | 10.73 | 10.85 | 11.02 | 10.54 | 10.64 |

According to Table 1, the overall ionic conductivity of the materials in in Examples 1 and 2 hardly decreased when compared to those in Comparative Examples 1-3, although the viscosity of the electrolyte significantly increased after the mixing with the particles. It means that the prepared gelled electrolyte not only show the favorable mechanical properties of the polymer electrolyte but also the high conductivity of the liquid electrolyte.

Figure 5:
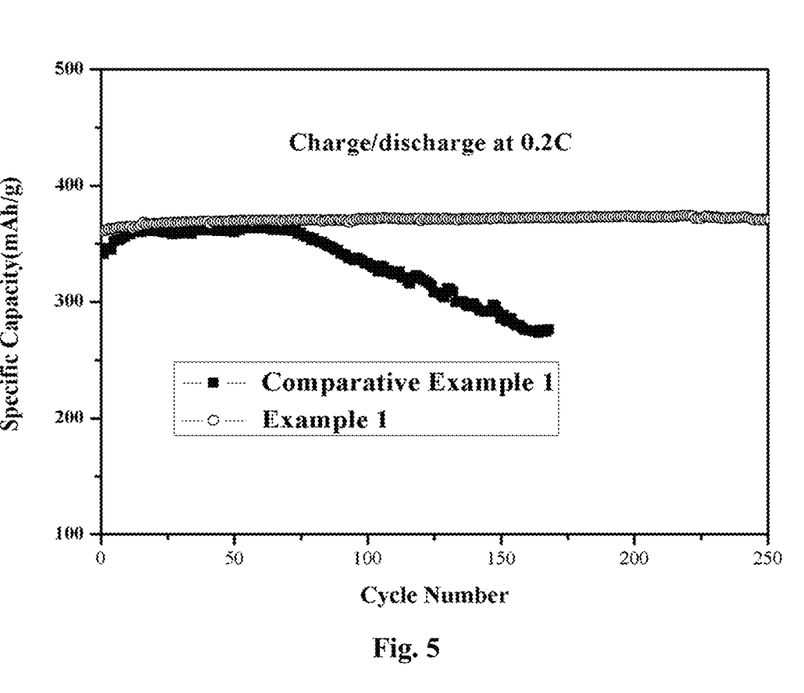
FIG. 5 shows the cycle performance of the electrolytes prepared in Example 1 and Comparative Example 1.
Figure 6:
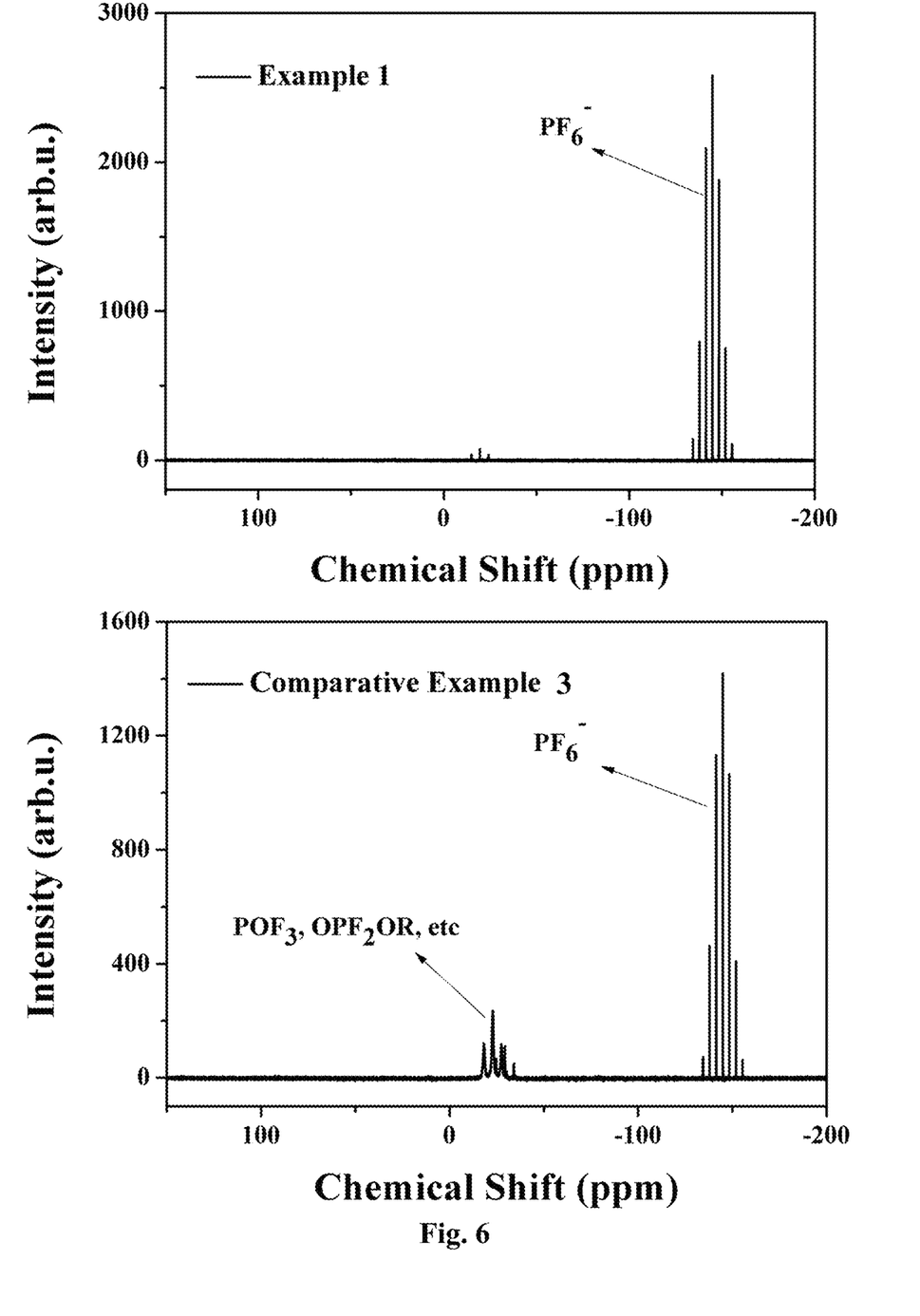
FIG. 6 shows the stability test result of electrolytes prepared in Example 1 and Comparative Example 3.

As it can be seen in FIGS. 4-6 and explained in details below, it was particularly noteworthy that the gelled electrolytes prepared with the un-modified alumina particles were superior to other electrolytes including the pure liquid electrolyte.

Figure 2:
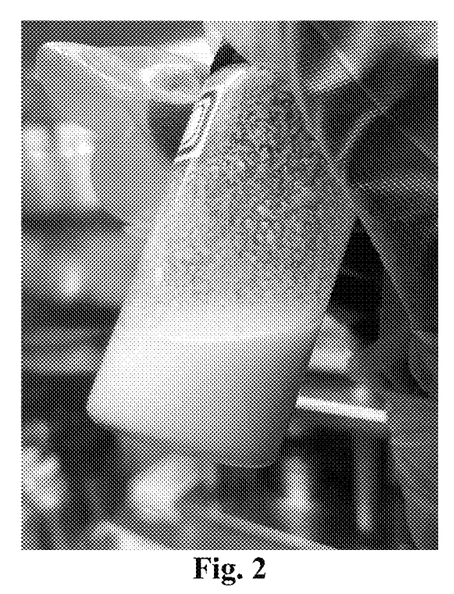
FIG. 2 shows the electrolyte of Comparative Example 4.

As it can be seen from FIG. 2, fumed titania particles of Comparative Example 4 could not form a gel. This suggests that a three-dimensional network is formed after ultrasonic or dispersing process in Example 1 as opposed to Comparative Example 4. Only the fumed alumina particles of Example 1 could form a three-dimensional network structure by hydrogen bonding in the electrolyte because of their unique loose structure.

Electrochemical Window Test

The prepared electrolyte in Example 1 was filled into a coin cell. This coin cell was a sandwich structure with lithium metal sheet (Li) and stainless steel sheet (SS) as two outsides cover, and polyethylene film (PE) as internal separator in the middle. Such structure may be referred to as Li/PE/SS. The electrochemical stability window test was performed using linear sweep voltammetry (using the Electrochemical Workstation Model No: CHI 600D, CH Instruments, USA) at a scan rate of 0.0005 mV/s. The results obtained by the test are shown in FIG. 3.

Figure 3:
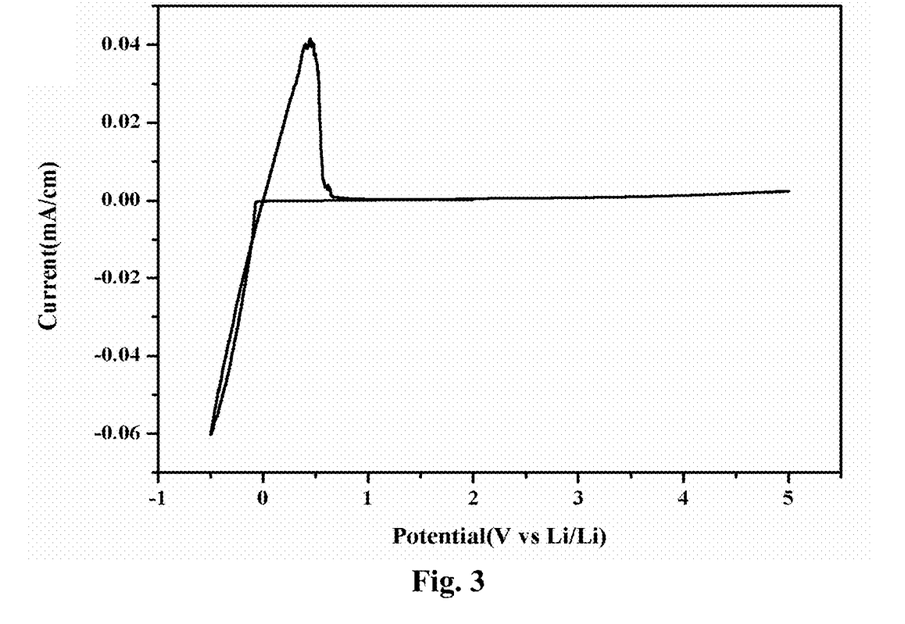
FIG. 3 shows the electrochemical stability window test result of the electrolyte prepared in Example 1.

FIG. 3 shows the electrochemical stability window of the composite electrolytes. The gelled electrolyte according to the present invention showed a very stable electrochemical window of approximately ≥5V, and thus it could be applied to current high-voltage electrode material system.

Electrochemical rate performance test Electrochemical rate performance refers to the multiple times of the rated capacity that the battery emits within a specified time. In this test, different batteries were assembled and tested for rate performance using various discharge current values including 0.1C, 0.2C, 0.3C, 0.4C, and 0.5C respectively. The results are shown in FIG. 4.

Figure 4:
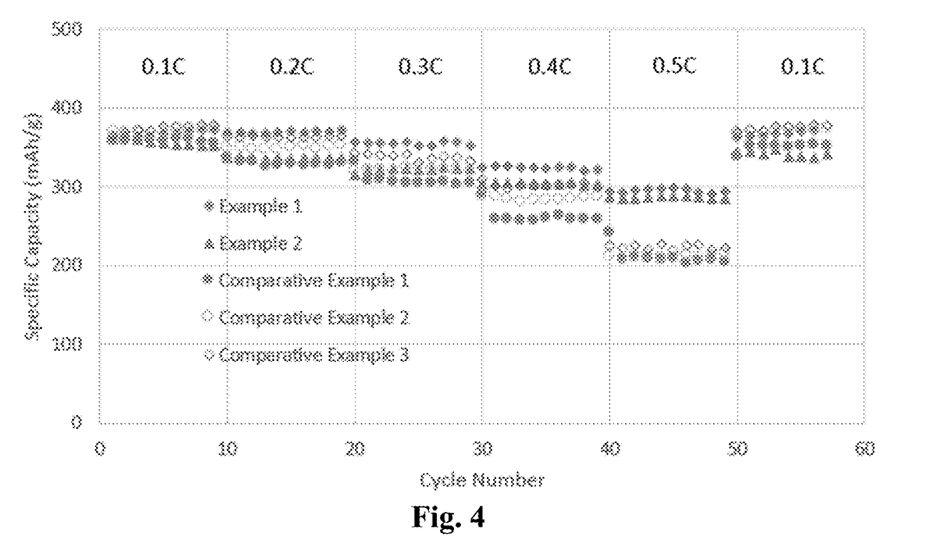
FIG. 4 shows the electrochemical rate performance test result of the electrolytes prepared in Example 1 and Comparative Examples 1-3.

As it can be seen from FIG. 4, there was no significant difference in discharge specific capacity of Li-ion batteries in different electrolytes at low magnification. As the discharge rate increased, the charge and discharge capacity generally decreased. Very surprisingly, the charge and discharge capacity of the gelled electrolytes prepared in Examples 1 and 2 were significantly higher than those in Comparative Examples 1, 2, and 3 at 0.5C. Conclusively, the composite electrolyte of the present invention was beneficial to improve the rate performance of Li-ion batteries.

Cycle Performance of the Electrolyte

Graphite was used as the working electrode. During the test, the voltage range and rate for Galvano-static cycling was 0-1.5V and 0.2C respectively. The results are shown in FIG. 5.

For the Comparative Example 1, the charge and discharge capacity gradually decreases with increasing number of recharge cycles, and the capacity retention was only 73% after 150 cycles. The cycling performance of the gelled electrolyte of Example 1 was obviously better than that of the pure liquid electrolyte, and the capacity retention rate was 98% after 250 cycles, which meant that the composite electrolyte prepared in Example 1 of the invention had a significant beneficial effect on the cycling performance of the Li-ion battery.

Stability Test of Electrolyte

The prepared electrolytes of Example 1 and Comparative Example 3 were placed in an inert gas-protected glove box for 30 days, and then samples were taken for nuclear magnetic testing to check the stability. The results are shown in FIG. 6.

In Comparative Example 3, an amount of by-products appeared after the electrolyte prepared with surface unmodified silica particles was left for 30 days, indicating a large amount of side reactions occurred between silica and the electrolyte. In addition, the gelation phenomenon of the gelled electrolyte in Comparative Example 3 also gradually disappeared. Compared with Comparative Example 3, the unmodified fumed alumina particles selected in the present invention showed good compatibility with the electrolyte with almost no by-products.

Based on all the above test results, it was demonstrated that the gelled electrolyte of this invention not only showed favorable (gell) appearance properties but also maintained high ionic conductivity. In addition, compared with the composite electrolyte doped with silica particles, the electrolyte prepared by the present invention with unmodified fumed alumina particles showed obvious advantages in the respect of stability. The Li-ion batteries with the prepared electrolyte revealed better cycle performance and rate performance than other electrolytes even the one prepared by hydrophobic modified alumina particles. Besides, since the gel electrolyte itself owned better mechanical properties, it could also be capable to improve the battery safety.

As used herein, terms such as "comprise(s)" and the like as used herein are open terms meaning 'including at least' unless otherwise specifically noted.

All references, tests, standards, documents, publications, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A gelled electrolyte composition, comprising:
   i) fumed alumina particles, wherein the mean primary particle size of the particles is from 5 to 50 nm and the BET specific surface area is from 40 to 400 $m^2/g$;
   ii) at least two organic solvents; and
   iii) a lithium salt;
   wherein the amount of the fumed alumina particles is 0.2-10% by weight based on the total weight of the gelled electrolyte composition, and wherein the fumed alumina particles are not surface-modified.

2. The gelled electrolyte composition of claim 1, wherein the organic solvents are selected from the group consisting of: ethylene carbonate (EC); dimethyl carbonate (DMC); propylene carbonate; methylethyl carbonate; and diethyl carbonate.

3. The gelled electrolyte composition of claim 1, wherein the mean primary particle size of the fumed alumina particles is from 10 to 30 nm.

4. The gelled electrolyte composition of claim 1, wherein the BET specific surface area of the fumed alumina particles is from 50 to 150 $m^2/g$.

5. The gelled electrolyte composition of claim 1, wherein the amount of the fumed alumina particles is 0.5-8% by weight, based on the total weight of the gelled electrolyte composition.

6. The gelled electrolyte composition of claim 2, wherein the lithium salt is selected from the group consisting of: lithium hexafluorophosphate; lithium bis 2-(trifluoromethylsulfonyl)imide; $LiClO_4$; $LiBF_4$; $Li_2SiF_6$; and $LiN(SO_2CF_2CF_3)$.

7. The gelled electrolyte composition of claim 6, wherein the BET specific surface area of the fumed alumina particles is from 50 to 150 $m^2/g$ and the mean primary particle size of the fumed alumina particles is from 10 to 30 nm.

8. The gelled electrolyte composition of claim 7, wherein the amount of the fumed alumina particles is 0.5-8% by weight based on the total weight of the gelled electrolyte composition.

9. A method of preparing a gelled electrolyte, comprising the following steps:
   a) mixing at least two organic solvents and a lithium salt to obtain a liquid mixture; and
   b) dispersing fumed alumina particles in the liquid mixture to obtain the gelled electrolyte;
   wherein:
      the mean primary particle size of the fumed alumina particles is from 5 to 50 nm and the BET specific surface area of the fumed alumina particles is from 40 to 400 $m^2/g$;
      the amount of the alumina particles is 0.2-10% by weight, based on the total weight of the gelled electrolyte; and
      the alumina particles are not surface-modified.

10. The method of claim 9, wherein the electrochemical rate performance of the gelled electrolyte or a Li-ion battery comprising the gelled electrolyte is improved relative to electrolyte in which the alumina particles that are not surface-modified are replaced with either hydrophobically modified fumed alumina particles or unmodified silica particles and wherein the alumina particles are the sole gellation component.

11. The method of claim 10, wherein the fumed alumina particles are dried before mixing in step a).

12. The method of claim 9, wherein the mean primary particle size of the fumed alumina particles is from 10 to 30 nm.

13. The method of claim 9, wherein the BET specific surface area of the fumed alumina particles is from 50 to 150 $m^2/g$.

14. The method of claim 9, wherein the amount of the fumed alumina particles is 0.5-8% by weight based on the total weight of the gel composition.

15. The method of claim 11, wherein the mean primary particle size of the fumed alumina particles is from 10 to 30 nm.

16. The method of claim 15, wherein the BET specific surface area of the fumed alumina particles is from 50 to 150 $m^2/g$.

17. The method of claim 16, wherein the amount of the fumed alumina particles is 0.5-8% by weight based on the total weight of the gelled electrolyte.

18. A Li-ion battery, comprising the gelled electrolyte composition of claim 1.

19. The Li-ion battery of claim 18, wherein the mean primary particle size of the fumed alumina particles in the gelled electrolyte is from 10 to 30 nm.

20. The Li-ion battery of claim 19, wherein the BET specific surface area of the fumed alumina particles in the gelled electrolyte is from 50 to 150 $m^2/g$ and wherein the amount of the fumed alumina particles in the gelled electrolyte is 0.5-8% by weight based on the total weight of the gelled electrolyte.

* * * * *

UNITED STATES PATENT AND TRADEMARK OFFICE
CERTIFICATE OF CORRECTION

PATENT NO. : 11,996,519 B2
APPLICATION NO. : 17/274185
DATED : May 28, 2024
INVENTOR(S) : Su et al.

Page 1 of 1

It is certified that error appears in the above-identified patent and that said Letters Patent is hereby corrected as shown below:

In the Claims

In Column 9, the last line of Claim 14:
"...of the gel composition" should have read "...of the gelled electrolyte"

Signed and Sealed this
Eleventh Day of February, 2025

Coke Morgan Stewart
*Acting Director of the United States Patent and Trademark Office*